US012803254B2

(12) United States Patent
Yang et al.

(10) Patent No.: US 12,803,254 B2
(45) **Date of Patent: *Nov. 17, 2026**

(54) WEATHERPROOF MULTIPURPOSE ENCLOSURE WITH INTEGRATED FLASHING

(71) Applicant: Unirac, Inc., Albuquerque, NM (US)

(72) Inventors: Alex Cheng-Chi Yang, Redwood City, CA (US); Byron James Madden, Kingwood, TX (US); Ryan Mac McClister, Houston, TX (US)

(73) Assignee: Unirac, Inc., Albuquerque, NM (US)

( * ) Notice: Subject to any disclaimer, the term of this patent is extended or adjusted under 35 U.S.C. 154(b) by 216 days.

This patent is subject to a terminal disclaimer.

(21) Appl. No.: 18/806,914

(22) Filed: Aug. 16, 2024

(65) Prior Publication Data

US 2024/0405534 A1 Dec. 5, 2024

Related U.S. Application Data

(63) Continuation of application No. 17/828,943, filed on May 31, 2022, now Pat. No. 12,068,592, which is a (Continued)

(51) Int. Cl.

| | |
|---|---|
| ***H02G 3/08*** | (2006.01) |
| ***H02S 20/23*** | (2014.01) |
| ***H02S 40/34*** | (2014.01) |

(52) U.S. Cl.

CPC ............. *H02G 3/088* (2013.01); *H02G 3/081* (2013.01); *H02S 20/23* (2014.12); *H02S 40/34* (2014.12)

(58) Field of Classification Search

CPC .......... H02G 3/08; H02G 3/081; H02G 3/088; H02G 1/00; H02G 3/083; H02G 3/086;

(Continued)

(56) References Cited

U.S. PATENT DOCUMENTS

| | | |
|---|---|---|
| 4,298,204 A | 11/1981 | Jinkins |
| 4,526,407 A | 7/1985 | Kifer |

(Continued)

FOREIGN PATENT DOCUMENTS

| | | |
|---|---|---|
| CN | 303948691 | 11/2016 |
| JP | 1454965 | 10/2012 |
| JP | 2015079763 | 11/2022 |

OTHER PUBLICATIONS

QBoxTM Installation Manual, Quick Mount PV, Aug. 2017 in 16 pages.

(Continued)

*Primary Examiner* — Angel R Estrada

(74) *Attorney, Agent, or Firm* — Lee & Hayes, P.C.

(57) ABSTRACT

Enclosure assemblies with integrating flashing for protecting an accessory on a rooftop. The enclosure assemblies can include a base configured to protect the rooftop from water intrusion and a cover configured to be joined to the raised portion of the base. The base can include a bottom wall and a raised portion extending from the bottom wall. The base can include an uphill portion configured to be positioned beneath at least one full course of roof shingle on the rooftop, without having to cut the roof shingle. The raised portion can be disposed off-center relative to the central transverse axis of the bottom wall, leaving the uphill portion of the bottom wall uncovered.

20 Claims, 18 Drawing Sheets

Related U.S. Application Data continuation of application No. 17/014,555, filed on Sep. 8, 2020, now Pat. No. 11,349,288, which is a continuation of application No. 16/781,785, filed on Feb. 4, 2020, now Pat. No. 10,804,685, which is a continuation of application No. 16/030,488, filed on Jul. 9, 2018, now Pat. No. 10,594,121.

(58) Field of Classification Search

CPC ........... H02S 20/23; H02S 40/34; H05K 5/00; H05K 5/02; H05K 5/0204; H05K 5/0247

USPC ....... 174/50, 480, 481, 53, 57, 58, 520, 535, 174/502, 503; 220/3.2–3.9, 4.02; 248/906; 277/641, 590, 312

See application file for complete search history.

(56) References Cited

U.S. PATENT DOCUMENTS

| | | | | |
|---|---|---|---|---|
| 5,226,263 | A | 7/1993 | Merrin et al. | |
| 5,357,054 | A | 10/1994 | Beckerich | |
| 5,931,325 | A | 8/1999 | Filipov | |
| 6,740,809 | B2 | 5/2004 | Vacheron | |
| 6,942,189 | B2 | 9/2005 | Capozzi et al. | |
| 7,208,678 | B2 | 4/2007 | Shinmura et al. | |
| 7,626,118 | B1 | 12/2009 | Capozzi | |
| 8,471,145 | B2 | 6/2013 | Suzuki | |
| 8,479,455 | B2 | 7/2013 | Shaefer et al. | |
| 8,875,455 | B1 | 11/2014 | Yang et al. | |
| 9,153,950 | B2 | 10/2015 | Yamanaka et al. | |
| 9,496,697 | B1 | 11/2016 | Wentworth | |
| 9,742,173 | B2 | 8/2017 | Wentworth | |
| 9,819,166 | B1 | 11/2017 | Capozzi | |
| 10,024,061 | B2 | 7/2018 | Ainger | |
| 10,230,227 | B1 | 3/2019 | Wade et al. | |
| 10,505,354 | B2 | 12/2019 | Wade et al. | |
| 10,594,121 | B2 | 3/2020 | Yang et al. | |
| 10,804,685 | B2 | 10/2020 | Yang et al. | |
| 11,515,693 | B2 | 11/2022 | Wade et al. | |
| 11,848,548 | B1 | 12/2023 | Affentranger, Jr. et al. | |
| 11,862,954 | B1 | 1/2024 | Capozzi | |
| 12,068,592 | B2 * | 8/2024 | Yang ...................... | H02G 3/088 |
| 2017/0110863 | A1 | 4/2017 | Wentrworth | |
| 2025/0379435 | A1 | 12/2025 | Yang | |

OTHER PUBLICATIONS

"What Sets Quick Mount PV Apart", YouTube Video <https://www.youtube.com/watch?v=PcDmx-bNYfU>, Dec. 14, 2016, 2 pages.
EZ Solar, "EZ Solar JB 1 Installation Instructions", YouTube Video <https://www.youtube.com/watch?v=arDndSxveVw>, Dec. 6, 2021, 3 pages.
globalindustrial.com—Material Handing Equipment | Workbenches | Furniture | Tools | Motors, "Vynckier Vm773ct Vm 7" X 7" X 3" Non-Metallic Enclosure, Transparent Cover" Product Listing, 2 pages.
Millennium Solar Electric Training Academy (MSETA), "How to wire up a soladeck", YouTube Vidoe <https://www.youtube.com/watch?v=OM6eHYM1me8>, May 30, 2013, 3 pages.
Photographs of JB-1.2 and JB-1XL, 9 pages.
PPM Solar, "How to install a soladeck", YouTube Video <https://www.youtube.com/watch?v=pqU0685Ax60>, Feb. 16, 2016, 6 pages.
QBox Patented Junction Box for Composition/Asphal Shingle Roofs Installation Manual, Rev. 2, Nov. 2017, 16 pages.
Quick Mount PV, QmQB-J1: QBox, Flashed Junction Box, 4" x 5-1/2" Drawing, Aug. 29, 2017, 2 pages.
roofingcontractor.com, "Dish-mounting System", Availalbe at <https://www.roofingcontractor.com/articles/84717-dish-mounting-system> Aug. 1, 2004, 1 page.
Roofmaster Product Company, Quality Toods & Equipment 2017 Catalog, 2017, 132 pages.
RSTC Enterprises, "Commdeck Installation Video" YouTube Video <https://www.youtube.com/watch?v=x2NytlJfy_I> , Apr. 5, 2016, 3 pages.
RSTC Enterprises, Inc., "RSTC Adds Flashed Combiner/Enclosure Box for SOlar Panel and PV Installations", Nov. 12, 2007.
RSTC Enterprises, Inc., CommDeck Installation Instructions, 2017, 5 pages.
RSTC Enterprises, Inc., Installation Manual for SolaDeck Models 0783-41 and 0786-41, First Edition, Feb. 2009, 10 pages.
Soladeck Products, Available at <https://web.archive.org/web/20180408104727/http:/www.rstcenterprises.com/soladeck/products/index.phtml>, Retrieved on Mar. 10, 2026, 1 page.
Solarpowerworldonline.com, "SPW's picks for the Top Solar Products of 2017", Available at <https://www.solarpowerworldonline.com/2017/12/spws-picks-top-solar-products-2017/> Dec. 4, 2017, 12 pages.
Vynckier Enclosure Systems, Inc., "VM Series Enclosures—NEMA 4x Rated Non-Metallic Enclosures", VM Series Data Sheet, Jan. 12, 2016, 2 pages.
Vynckier Enclosure Systems, Inc., "VM Series Configuration Options and Specifications", Dec. 19, 2012, 7 pages.
Vynckier Enclosure Systems, Inc., "VM Series Miniature Enclosures", VM Series Non-Metallic Enclosures, Mar. 10, 2011, 2 pages.
Vynckier Enclosure Systems, Inc. "VM 775 VM Series Enclosure" Dimensional Sheet Drawings, May 29, 2001, 1 page.
Vynckier Enclosure Systems, Inc., "The World of Vynckier", Non-Metallic Catalog, Apr. 6, 2012, 41 pages.
Zilla Electrical Flashing Assembly Solar Design Components—Zilla, Available at <https://zillarac.com/product/electrical-flashing-assembly/>, retrieved on Feb. 26, 2026, 4 pages.
Zilla Electrical Flashing Assembly Installation Instructions, 2016, 2 pages.
Zilla Electrical Flashing Assembly Overview, 2016, 1 page.
Zilla Electrical XL Flashing Overview, 2016, 1 page.
Zilla Electrical XL Flashing Installation Instructions, 2016, 2 pages.
Zilla, Solar Mounting Flashings | Electrical | Thermal | Zip | Double Stud, available at <https://web.archive.org/web/20180129173619/http://www.zillarac.com/Zilla/Flashings-c5.aspx)>, retrieved on Mar. 6, 2026, 4 pages.
Zillarac, "Zilla Electrical Flashing Installation", YouTube Video <https://www.youtube.com/watch?v=aeom8zFzQqs>, Oct. 17, 2011, 1 page.
Zillarac, "Zilla Electrical XL Flashing", YouTube Vidoe <https://www.youtube.com/watch?v=kNMX239wsZE>, Jan. 31, 2018, 3 pages.
Office Action for U.S. Appl. No. 19/311,812, dated Dec. 5, 2025, 11 Pages.

* cited by examiner

WEATHERPROOF MULTIPURPOSE ENCLOSURE WITH INTEGRATED FLASHING

INCORPORATION BY REFERENCE TO ANY PRIORITY APPLICATIONS

This application is a continuation of U.S. patent application Ser. No. 17/828,943, filed May 31, 2022, which is a continuation of U.S. patent application Ser. No. 17/014,555, filed Sep. 8, 2020, now U.S. Pat. No. 11,349,288, which is a continuation of U.S. patent application Ser. No. 16/781,785, filed Feb. 4, 2020, now U.S. Pat. No. 10,804,685, which is a continuation Ser. No. 16/030,488, filed Jul. 9, 2018, now U.S. Pat. No. 10,594,121, each of which is hereby incorporated by reference in its entirety herein.

BACKGROUND

Field

The apparatuses and methods disclosed herein relate generally to multipurpose enclosures, such as weatherproof multipurpose enclosures configured to couple to the exterior of a structure.

Description of the Related Art

Increasingly, property owners are installing electrical and/or mechanical components on the exterior of buildings or other structures. For example, some property owners have begun installing solar panels on roofs to reduce the reliance on traditional power suppliers. In some cases, installation and proper operation of an electrical and/or mechanical component does not require the component be coupled to an external part or power source (e.g., the component itself includes a power supply). Thus, the electrical and/or mechanical component can be installed as a self-contained unit without any cables, wires, or other connectors extending therefrom.

However, in other cases, installation and proper operation of an electrical and/or mechanical component does require the component be coupled to an external part or power source. To couple the electrical and/or mechanical component to the external part or power source, an installer may be required to route a connector from the exterior of the structure to the interior of the structure. In such a situation, the electrical and/or mechanical component, the connector, and/or the interior of the structure may be susceptible to weather-related damage.

SUMMARY

As described above, installing an electrical and/or mechanical component to the exterior of a structure may require a connector be coupled between the component and the interior of the structure. For example, installation of a solar panel on a roof of a structure may require cables, wires, and/or the like extending from the solar panel be coupled to a junction or fuse box, which can be located inside the structure. To protect the cables, wires, and/or the interior of the structure from weather-related damage, the cables and/or wires can be routed inside the structure via a flashed enclosure placed on the roof.

Existing flashed enclosures require the installer to cut out a section of the roof tiles or shingles (e.g., composite, asphalt shingles) that corresponds to a shape of the enclosure so that the entire flashed enclosure is beneath one course of shingles. Cutting the roof shingles lengthens the installation process and exposes the roofing membrane to potential water intrusion. Further, the installer may damage the roof during the cutting process, which may allow water intrusion into a penetrated surface. For example, an improper amount or shape of shingle may be removed, resulting in water intrusion.

The enclosure assemblies described herein have integrated flashing and can be used for different applications, including mechanical, electrical, radio frequency, or other applications. The enclosure assemblies can include a base having a bottom wall and a raised portion extending from the bottom wall. The bottom wall and the raised portion form an interior space for housing components, such as connectors, conduits, cables, or otherwise. Unlike the existing flashed enclosures described above, an uphill portion of the bottom wall is sized and configured to be positioned beneath at least one full course of roof shingles, without having to cut the roof shingles to accommodate the uphill portion. The raised portion is positioned asymmetrically on the bottom wall, leaving the uphill portion of the bottom wall uncovered. For example, the raised portion can be offset relative to a transverse centerline of the bottom wall, so the raised portion is closer to a lower edge of the bottom wall than an upper edge of the bottom wall. The raised portion can be centered on or offset relative to a longitudinal centerline of the bottom wall. By minimizing the amount of roof shingle to cut or be removed or eliminating the step altogether, training is streamlined and total installation time is reduced. Further, because the uncovered portion extends beneath one full course of shingle, there is enhanced water protection. Water protection can be further enhanced by mounting a portion of the enclosure assembly that falls within an area created by a sealant applied in a horseshoe pattern, which is a protected area where water cannot enter.

The enclosure assembly can be mounted to the rooftop using one or more fasteners, such as screws, nails, or otherwise. However, mounting holes for the fasteners may be susceptible to leaks and the fasteners themselves may rust. Thus, it may be desirable to reduce the total number of fasteners to three fasteners, two fasteners, or one fastener. Further, all the fasteners can be positioned within the interior space of the raised portion to minimize any chance of water intrusion. For example, the total number of fasteners can be reduced by placing the fasteners in the center of the raised portion. In some methods of installation, a bead of sealant is applied on the underside of the enclosure assembly to form a sealed area. The sealant can be applied such that all of the fasteners are within the sealed area.

It may also be desirable to reduce the total amount of weight placed on the roof, for example, by choosing a lightweight material (e.g., polycarbonate) or by preventing water and debris from accumulating above the enclosure. Water and debris can also attract rodents or other pests. The enclosure assemblies described herein can include a rectangular bottom wall and four side walls extending from the bottom wall. Each of the four side walls can be positioned at an oblique angle, for example a 45 degree angle, relative to the lower or downhill edge of the bottom wall. The angled side walls allow water and debris to flow off the enclosure.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

Figure 1:
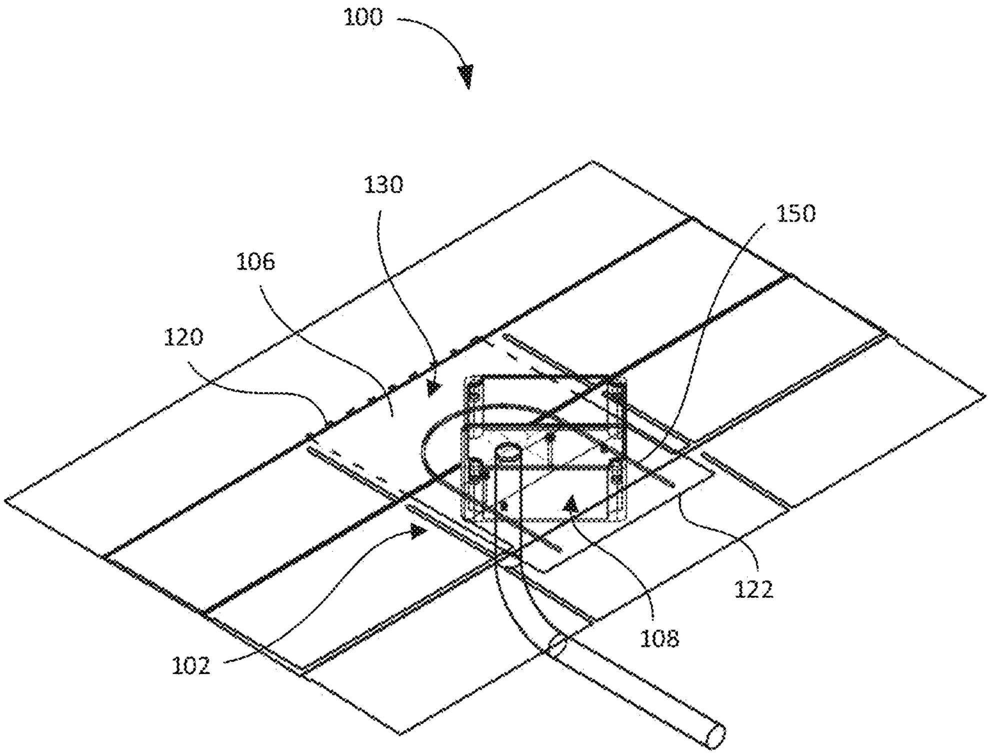
FIG. 1 illustrates an example enclosure assembly positioned on a rooftop.

FIG. 1 illustrates a waterproof enclosure assembly 100 (also referred to as a "flashing unit") mounted to a tile or shingle rooftop. An uphill portion 130 of the enclosure assembly 100 is sized to be positioned beneath at least one full course of roof shingles. The enclosure assembly 100 can be used for any application, such as electrical, mechanical, or radio frequency applications. For example, the enclosure assembly 100 can protect a connector, a conduit, a cable, or other component disposed within an interior space 110 of the enclosure assembly 100.

As shown in FIGS. 2A-2D, the enclosure assembly 100 can include a base 102 and a cover 104. Together, the base 102 and the cover 104 define a fully-enclosed, interior space 110 configured to house and protect the separate component (e.g., connector, conduit, or cable).

As shown in FIGS. 3A-3D, the base 102 can include a bottom wall 106 having an upper surface and a lower surface. The lower surface of the bottom wall 106 is configured to interface with the rooftop. The bottom wall 106 can include an upper edge 120, a lower edge 122, and two lateral edges 124 therebetween (see FIG. 2B). The two lateral edges 124 can be longer than the upper and lower edges 120, 122. For example, each lateral edge 124 can be at least 25% longer than each of the upper and lower edges 120, 122. When mounted to the rooftop, the upper edge 120 of the bottom wall 106 is uphill from the lower edge 122 of the bottom wall 106 (see FIG. 1). The bottom wall 106 is illustrated as rectangular, but can take on any other shape, including circular, triangular, or otherwise.

Figure 2A:
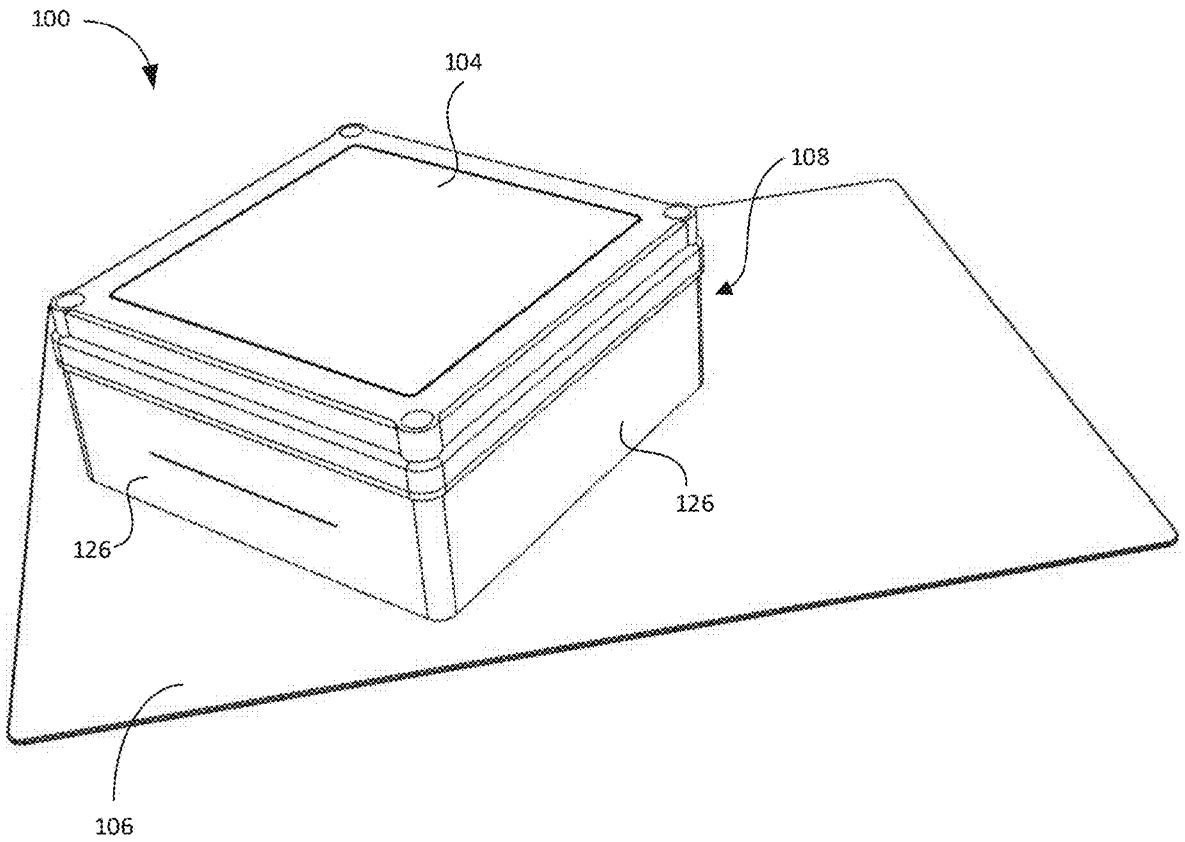
FIGS. 2A-2D illustrate various views of the enclosure assembly shown in FIG. 1. The enclosure assembly includes a base and a cover.
Figure 2B:
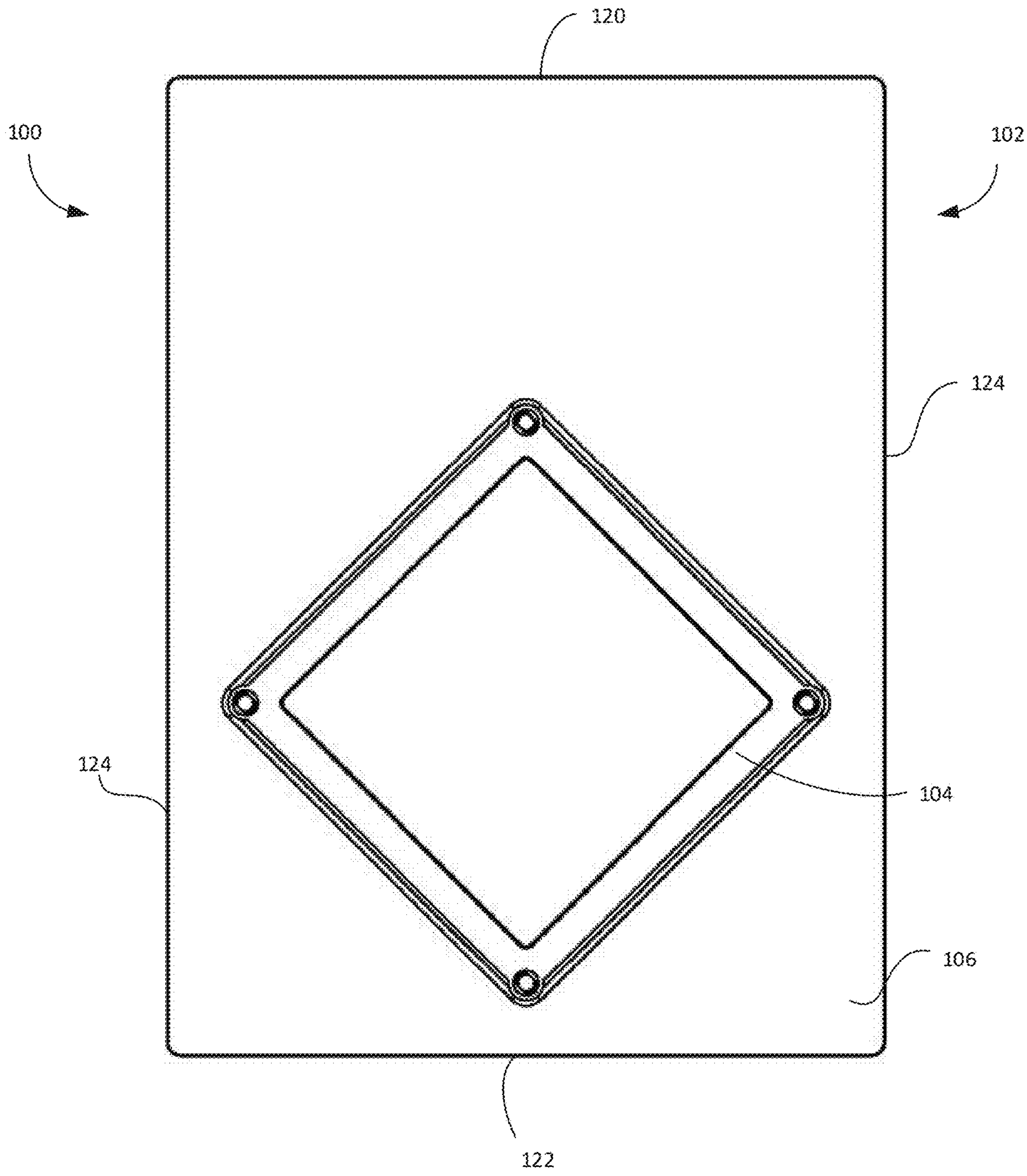
Figure 2C:
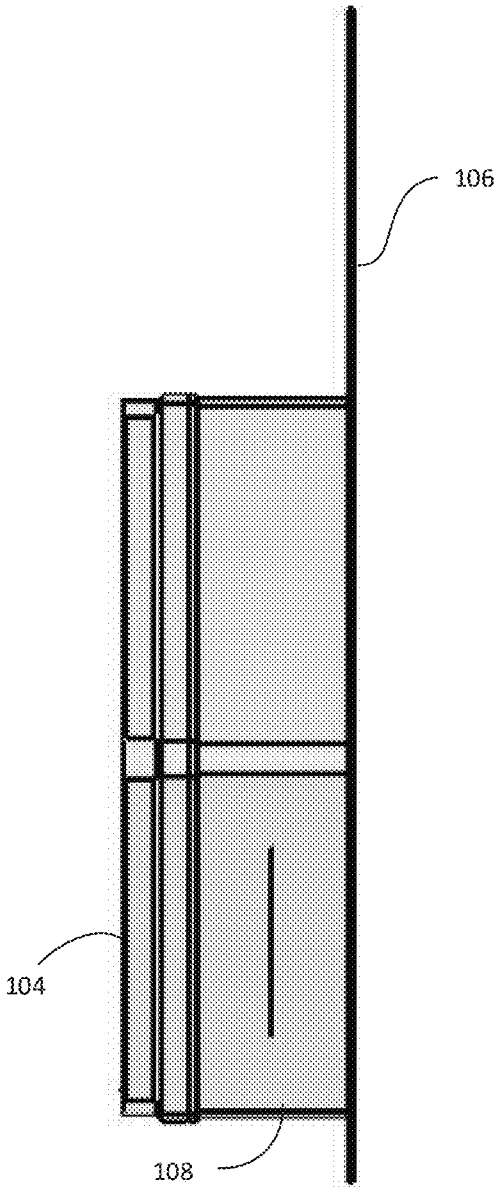
Figure 2D:
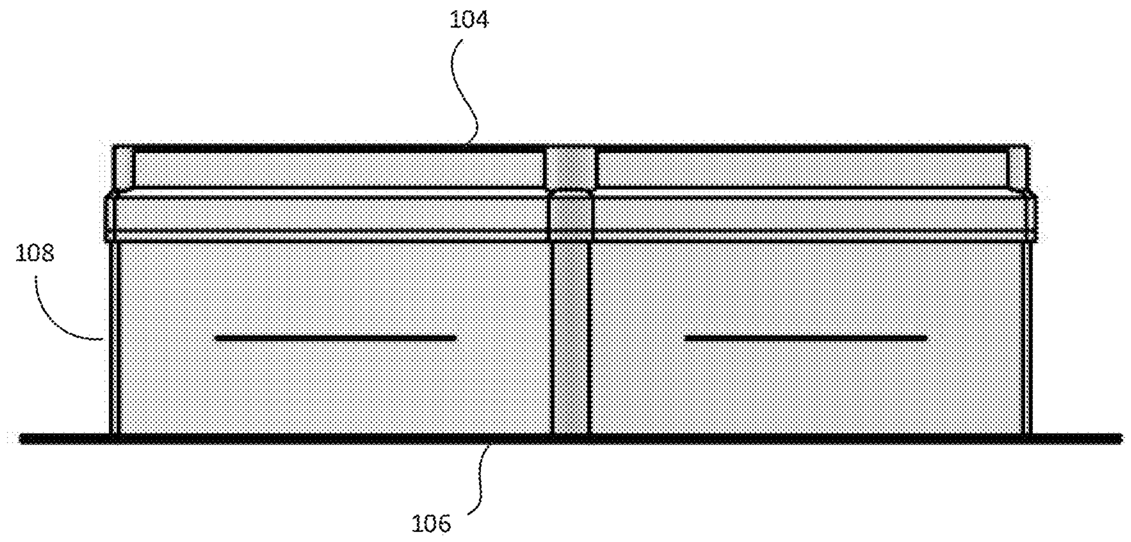

A raised portion 108, including one or more side walls 126, extends from the upper surface of the bottom wall 106 (see FIG. 2A). A surface area of the bottom wall 106 defined by the raised portion 108 is smaller than a total surface area of the bottom wall 106. For example, the surface area of the bottom wall 106 defined by the raised portion 108 can be less than one-half of the total surface area of the bottom wall 106, less than one-third of the total surface area of the bottom wall 106, less than one-quarter of the total surface area of the bottom wall, or otherwise. A length of each side wall 126 can be less than half a length of the lateral edges 124 of the bottom wall 106.

Figure 3A:
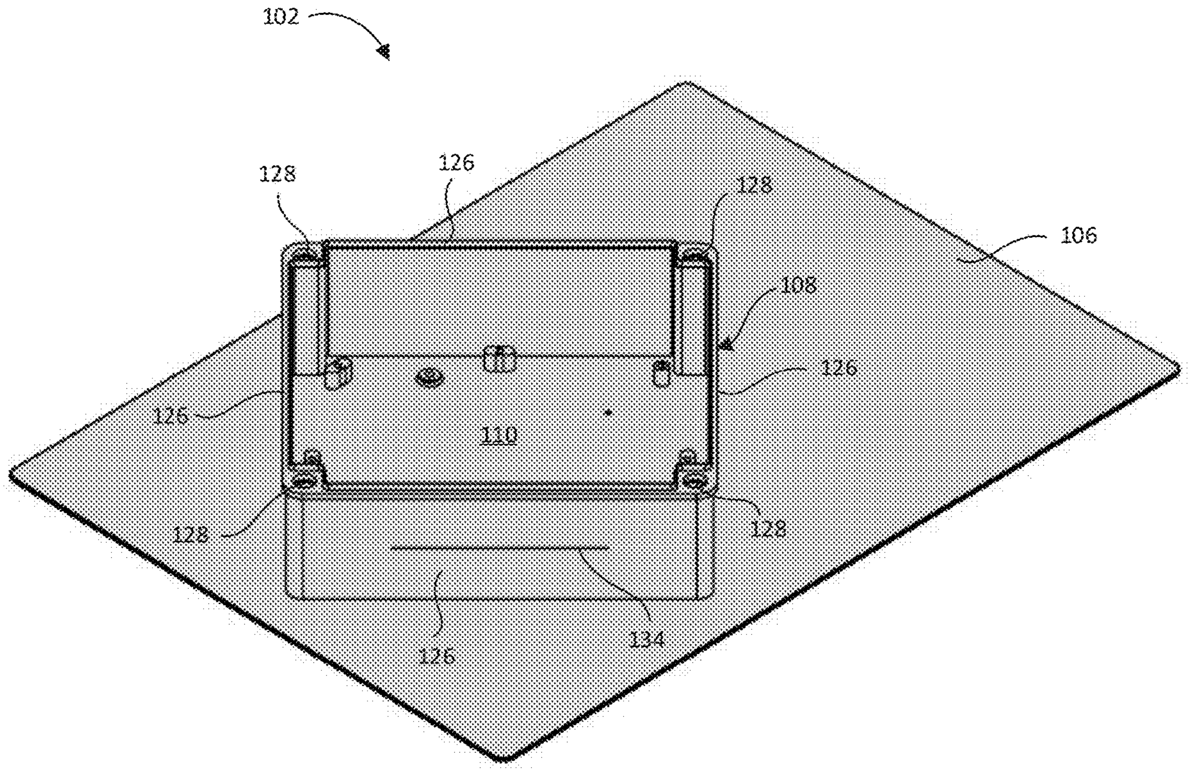
FIGS. 3A-3D illustrate various views of the base shown in FIGS. 2A-2D.

As shown in the figures, the one or more side walls 126 can be perpendicular to a plane extending across the upper surface of bottom wall 106. But in other configurations, the one or more side walls 126 can be at any angle relative to the plane extending across the upper surface of the bottom wall 106. Further, as shown in FIGS. 3A and 3B, a periphery of the raised portion 108 is square, but in other configurations, the periphery can be circular, triangular, rectangular, or any other shape.

One or more side walls 126 of the raised portion 108 can be aligned with and/or displaced from one or more edges of the bottom wall 106. As shown in FIG. 3B, the raised portion 108 can be spaced apart from each edge of the bottom wall 106. A lowest-most region 142 of the raised portion 108 can be displaced from the lower edge 122 of the bottom wall 106 by at least five percent of a total length of the lateral edge 124. A lateral-most region of the raised portion 108 can also be displaced from each lateral edge 124 of the bottom wall 106 by at least five percent of a total length of the lower edge 122.

The raised portion 108 can be asymmetrically positioned on the bottom wall 106. For example, as shown in FIG. 3B, the raised portion 108 can be offset relative to a transverse centerline X-X extending through the two lateral edges 124 of the bottom wall 106. The raised portion 108 can be positioned sufficiently closer to the lower edge 122 of the bottom wall 106 than the upper edge 120 of the bottom wall 106, so the uncovered, uphill portion 130 of the bottom wall 106 is sized and configured to be inserted underneath at least one full course of roof shingles without cutting the roof shingles. An upper-most region 144 of the raised portion 108 can be spaced apart from the upper edge 120 of the bottom wall 106 by at least one-quarter, at least one-third, at least one-half of a total length of the lateral edge 124 of the bottom wall 106, or more. The uncovered, uphill portion 130 can be sized to be positioned beneath at least one full course of roof shingles, thus enabling better security and protection against leaks. Further, the uncovered, uphill portion 130 can be free of any fasteners, which provides better waterproofing and reduces the likelihood of leaks. Further, the upper edge 120 can include a tapered edge to case installation. Because the installer does not have to cut the roof shingles to install the uphill portion 130 of the flashing base, installation of the enclosure assembly 108 is expedited.

Figure 3B:
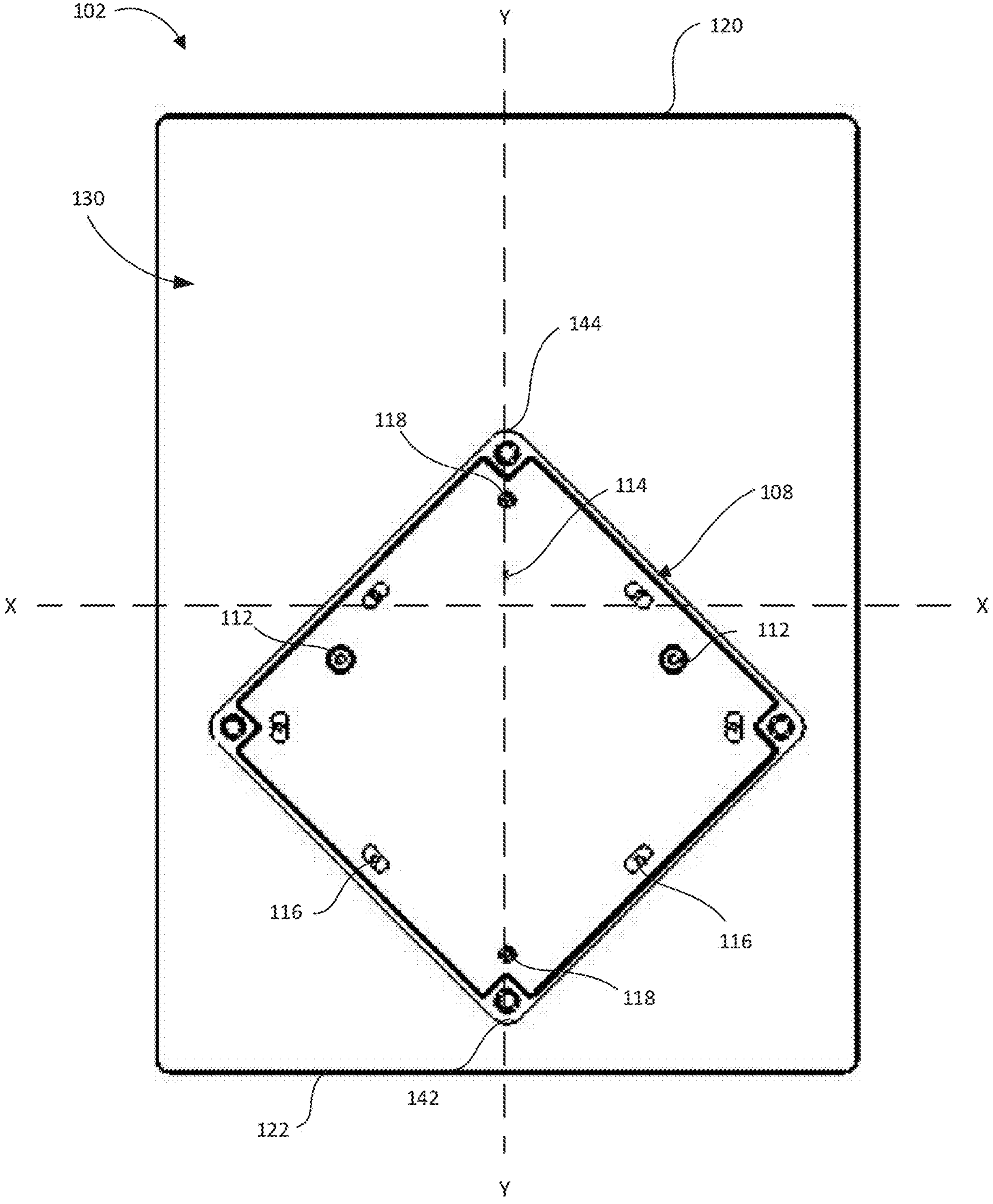
Figure 3C:
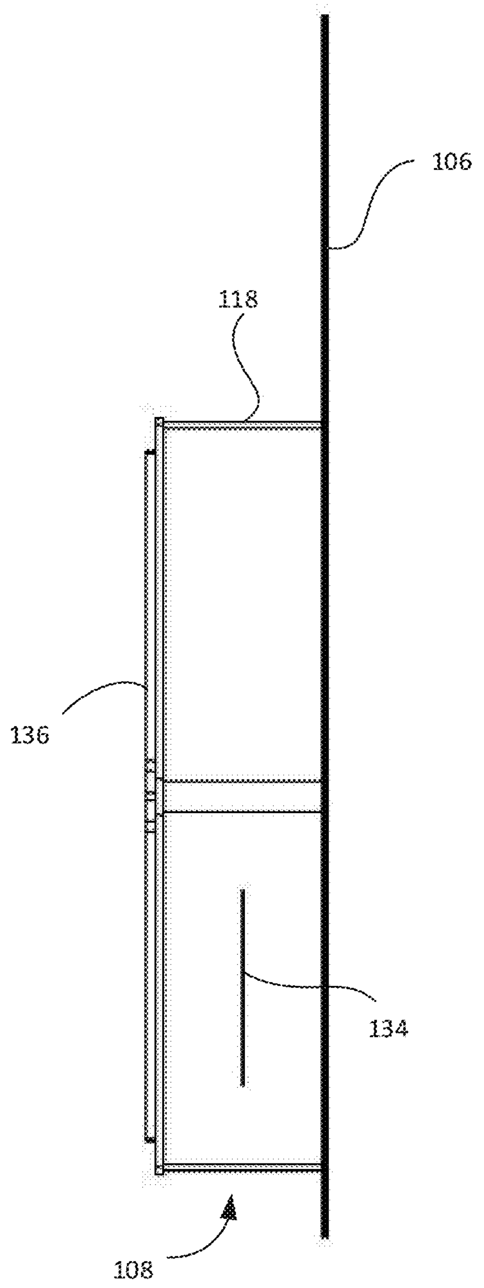
Figure 3D:
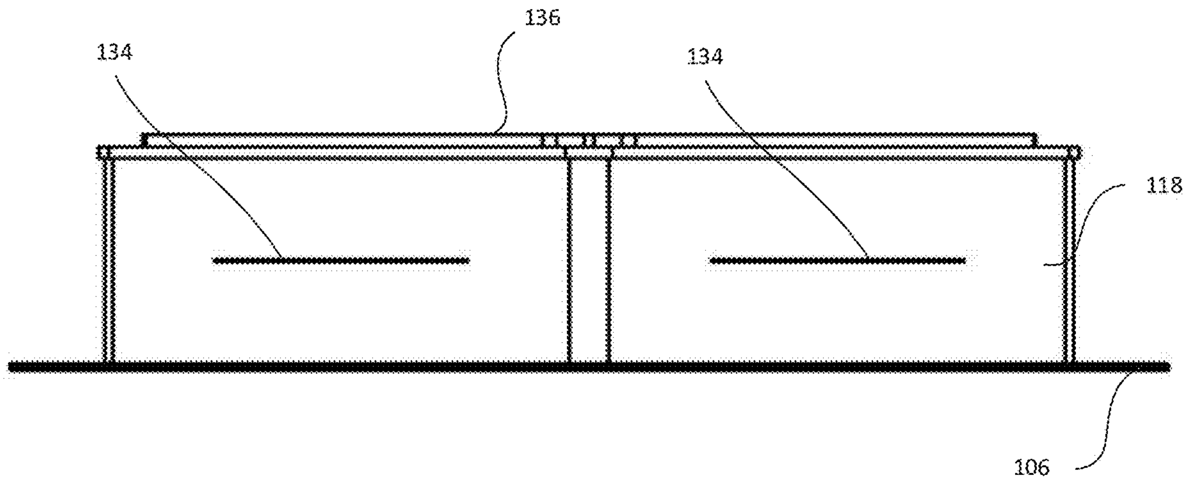

As shown in FIG. 3B, the raised portion 108 can be centered about a longitudinal centerline Y-Y extending through the upper edge 120 and the lower edge 122 of the bottom wall 106. But in other configurations, the raised portion 108 can be offset relative to the longitudinal centerline Y-Y and closer to one of the two lateral edges 124.

One or more side walls 126 of the raised portion 108 can be positioned at an oblique angle relative to a lower edge 122 of the bottom wall 106. As shown in FIG. 3B, each of the four side walls 108 can be positioned at an oblique angle relative to the lower edge 122 of the bottom wall 106. For example, each of the four side walls 108 can be positioned at a 45 degree angle relative to the lower edge 122 of the bottom wall 106. This angled configuration of side walls 108 prevents water or debris from collecting on the enclosure assembly 100. Excess water or debris would add weight to the roof and attract rodents or other animals.

Figure 4A:
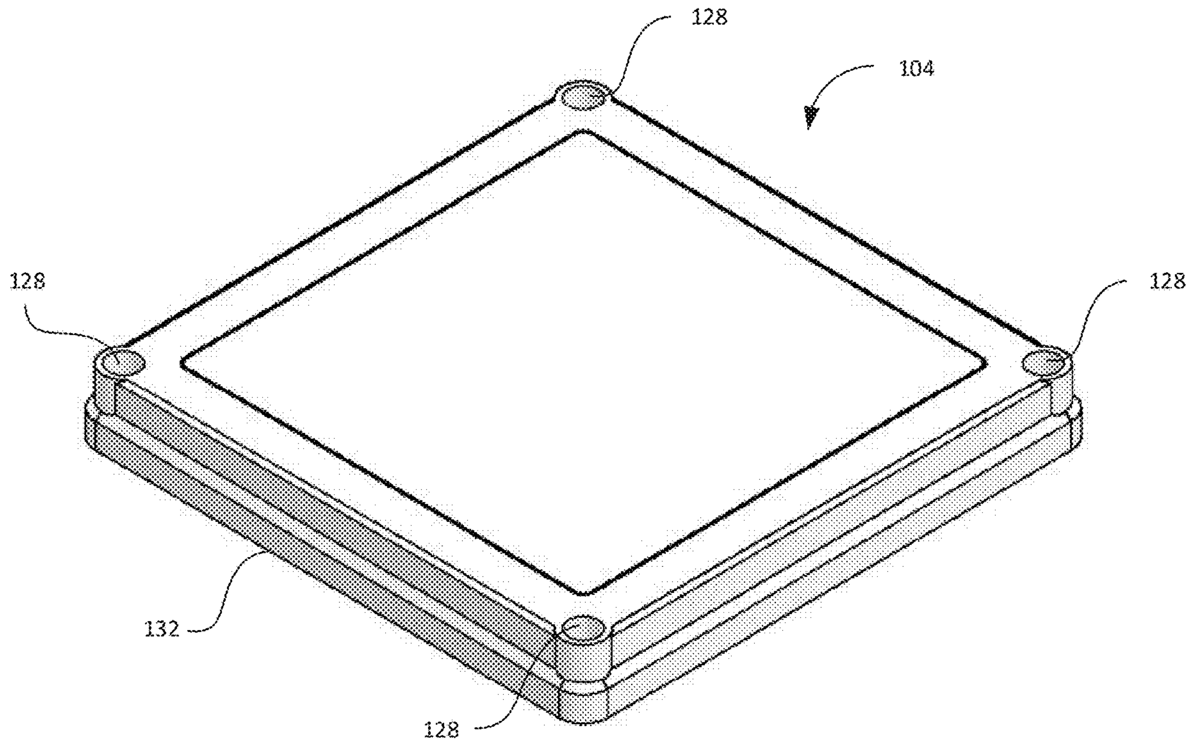
FIGS. 4A-4E illustrate various views of the cover shown in FIGS. 2A-2D.
Figure 4B:
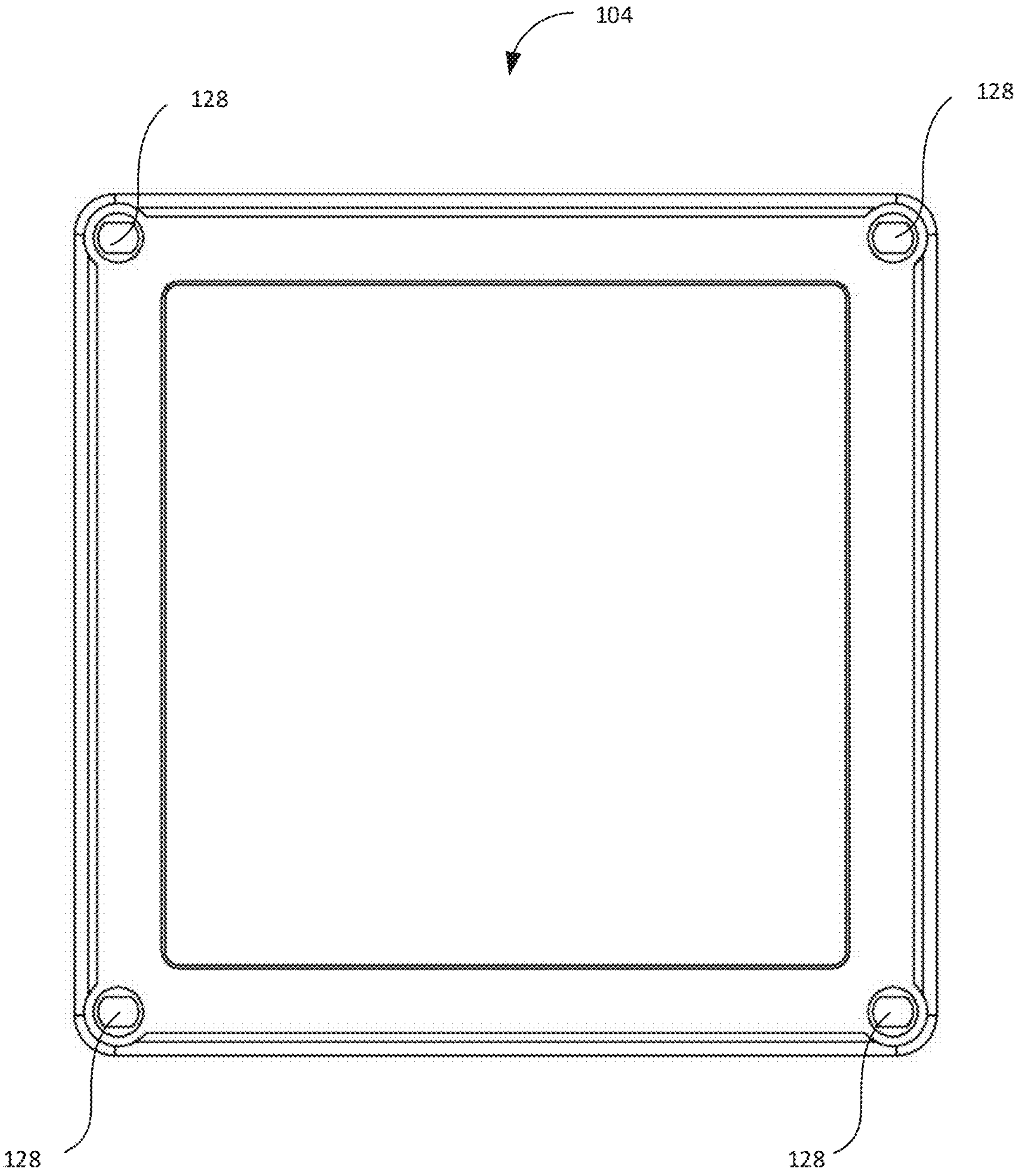
Figure 4C:
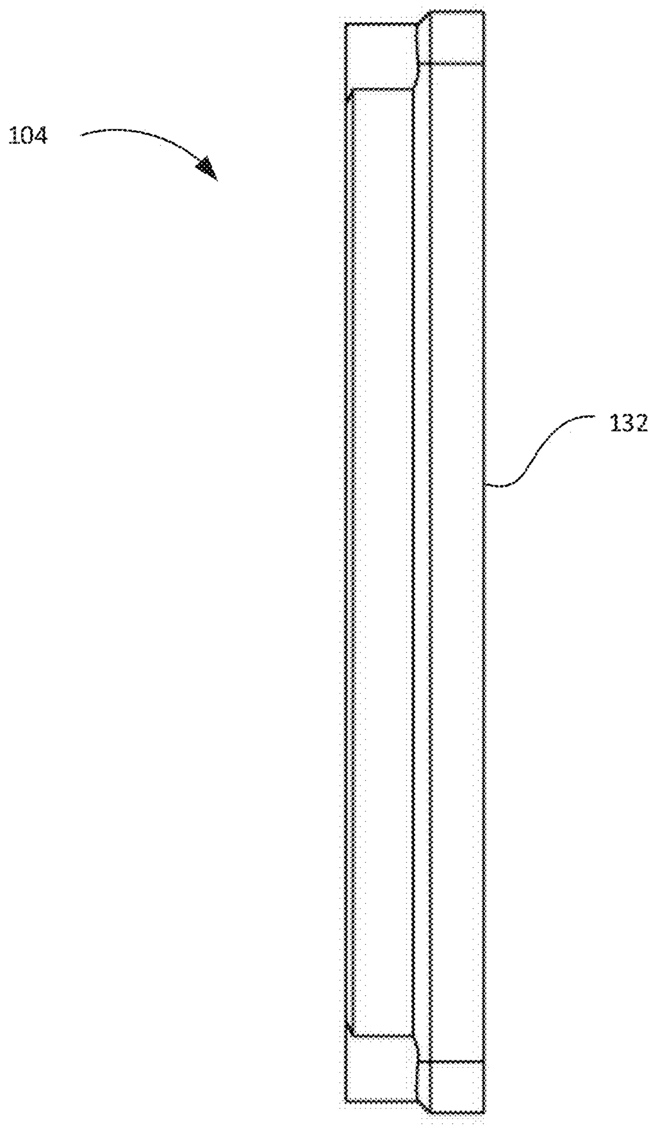

As shown in FIGS. 2A-2D, the cover 104 can form a top surface of the enclosure assembly 100. The cover 104 can take on the same shape as a periphery of the raised portion 108. For example, as shown in FIGS. 4A and 4B, the cover 104 can be square shaped.

Figure 4D:
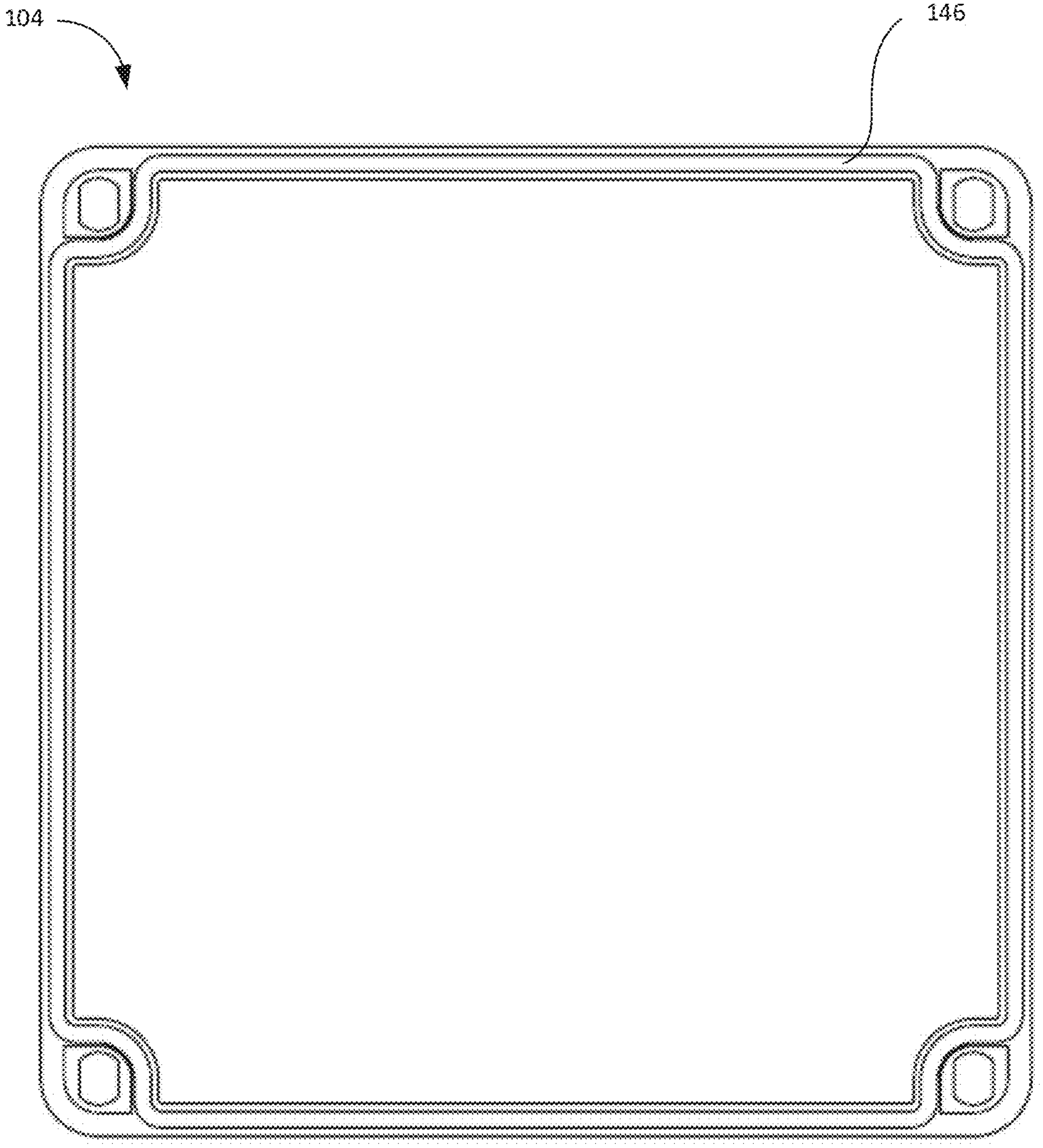
Figure 4E:
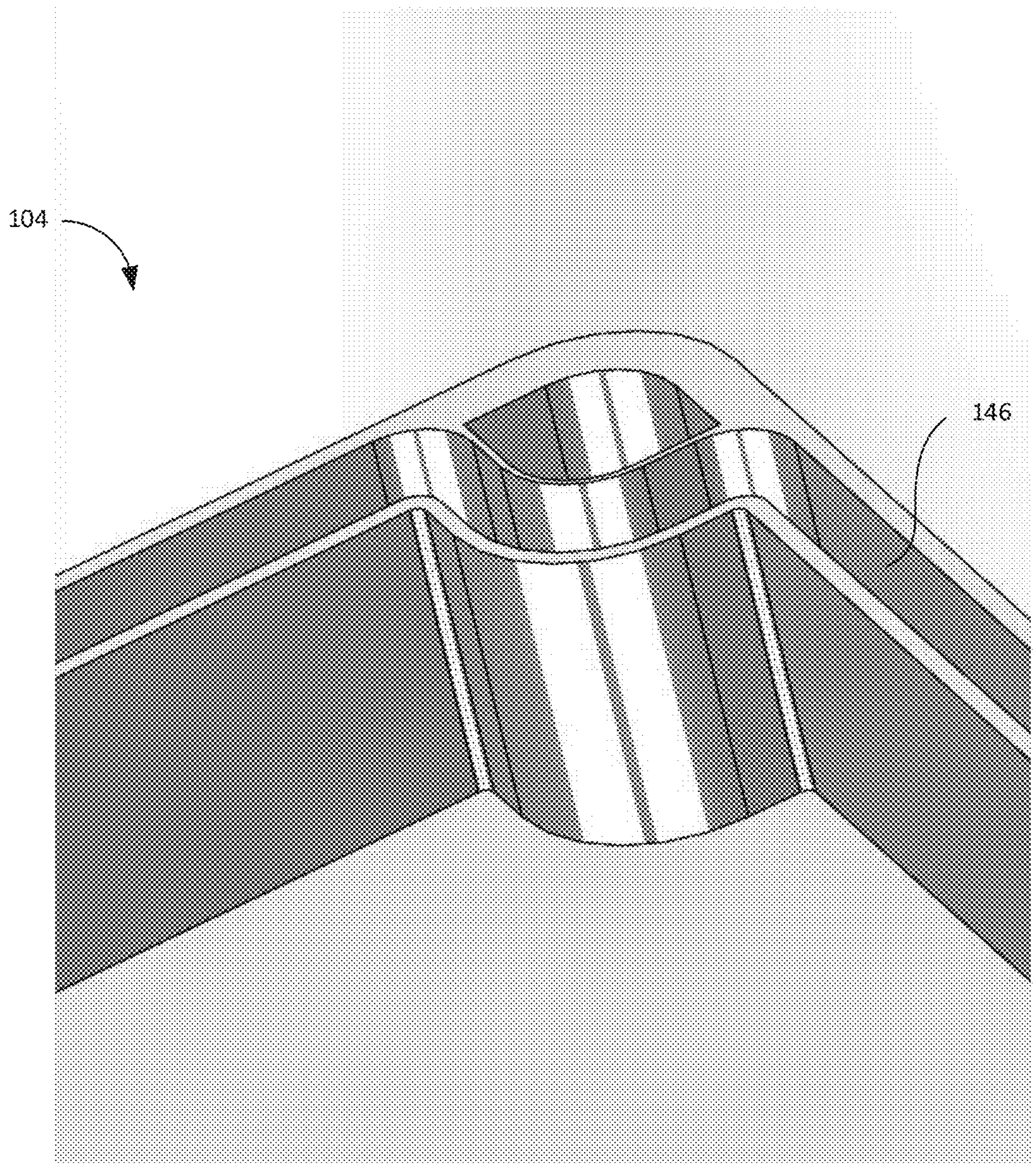

The cover 104 can be joined to each of the one or more side walls 126. For example, the cover 104 can be aligned with and/or joined to the base 102 by corresponding structures, such as a tongue and groove connection. As shown in FIGS. 4D and 4E, the bottom of the cover 104 can include a groove or channel 146 for receiving the gasket 140 and the raised portion 108 can include a tongue 136, or vice versa. The tongue and groove system can reinforce the seal formed by the gasket 140. For example, the gasket 140 may be a flexible substance filled to the top edge of the groove or channel 146 (such that the cover 104 can lie flat on a flat surface). The tongue 136 may be continuous along the side walls 126 of the raised portion 108 and may be aligned to the center-line of the groove or channel 146 when the cover 104 is joined to the one or more side walls 126. Joining the cover 104 to the one or more side walls 126 may cause the tongue 136 to protrude against the gasket 140. Protrusion of the gasket 140 may result in a portion of the gasket 140 extending over the tongue 136 toward an exterior of the one or more side walls 126 and/or a portion of the gasket 140 extending over the tongue 136 toward an interior of the one or more side walls 126. Thus, joining the cover 104 to the one or more side walls 126 may cause the gasket 140 to cover at least portions of the tongue 136 exposed to the exterior of and the interior of the enclosure assembly 100, thereby forming a seal.

Additionally or alternatively, the cover 104 can be joined to each of the one or more side walls 126 by one or more fasteners, such as captive screws. As shown in FIGS. 3A-3B and FIGS. 4A-4B, the raised portion 108 and the cover 104 can have one or more corresponding receiving holes 128 for the fasteners. For example, the receiving holes 128 can be positioned at each corner of the raised portion 108 and the cover 104. The holes 128 can be captive, such that the fasteners remain in place and do not fall out. One or more of the receiving holes 128 can include a non-circular (e.g., oval, squircle, or otherwise) periphery configured to receive the fastener 148 described below. When the cover 104 is removed from the base 102, the fasteners can be designed to be removed with the cover 104 or left behind with the base 102.

Figure 5A:
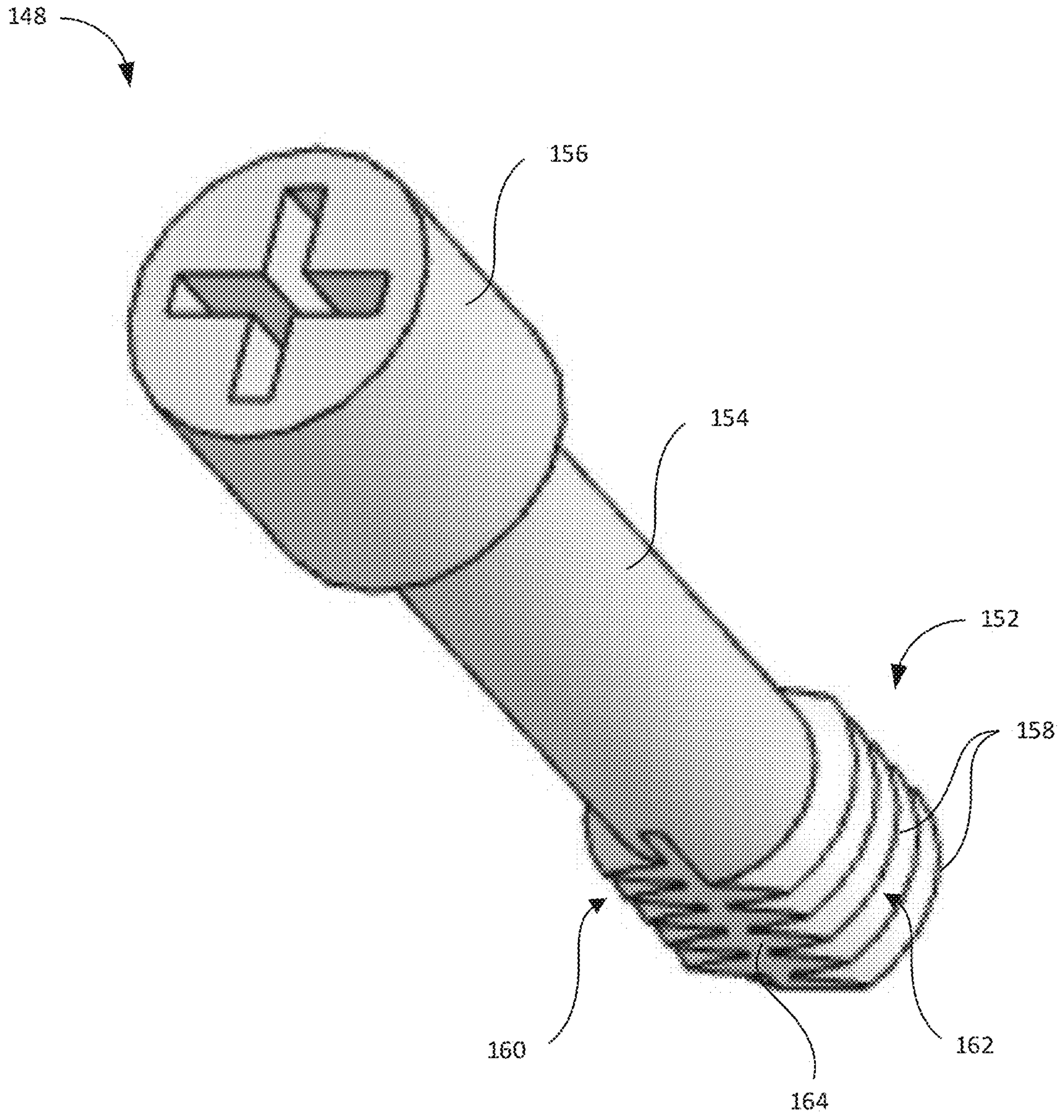
FIGS. 5A-5C illustrate various views of a fastener designed to interface with the cover shown in FIGS. 2A-2D.
Figure 5B:
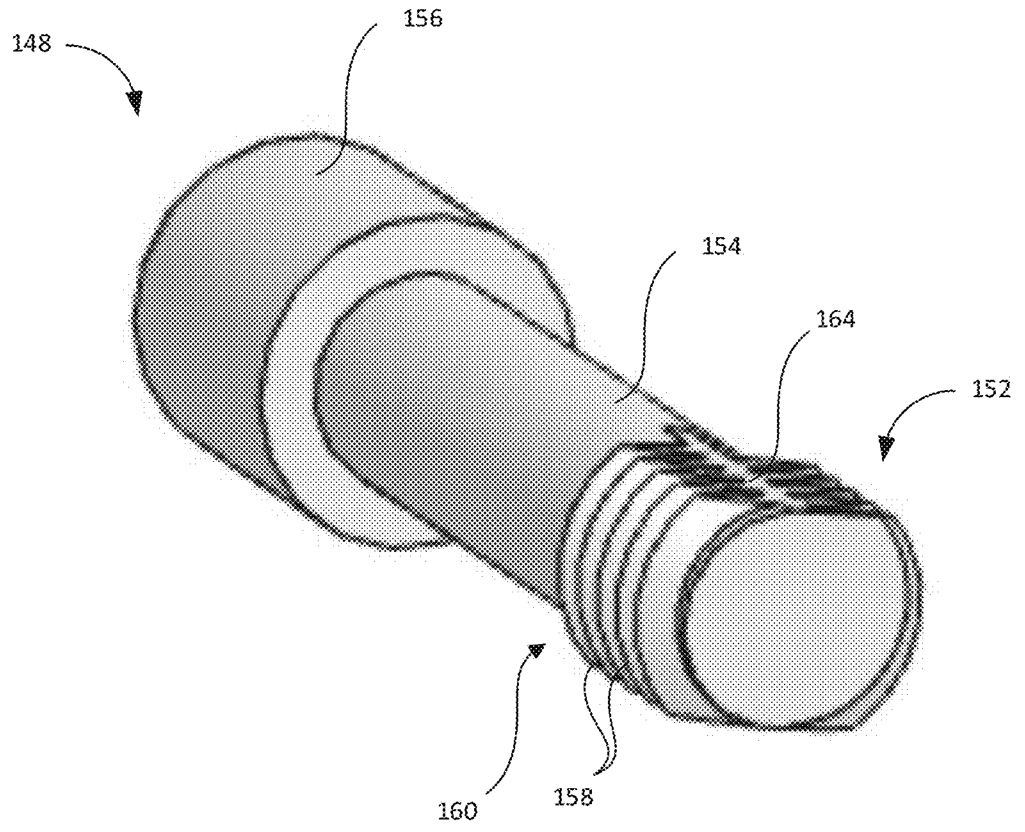
Figure 5C:
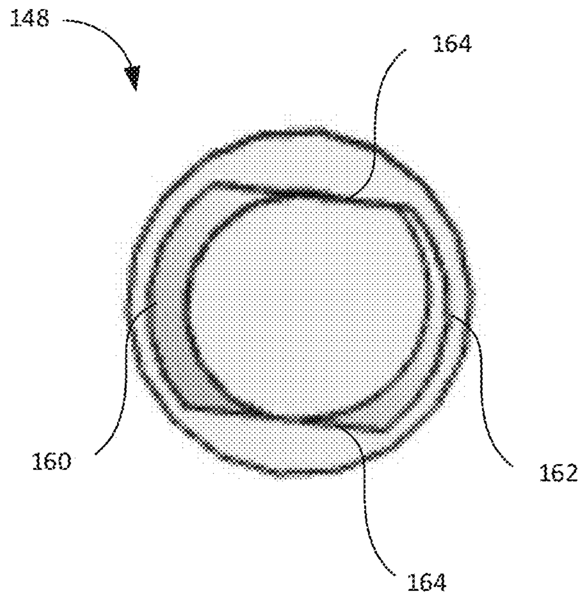

FIGS. 5A-5C illustrate an example fastener 148 that is designed to be captive and fit in the holes 128. The fastener 148 can include a proximal head 156 and a threaded end 152 separated by a non-threaded stem 154. As shown in FIG. 5A, the threaded end 152 of the fastener can include discontinuous thread portions 158. Each thread portion 158 can extend less than 180 degrees around a circumference of the stem 154, less than 150 degrees around a circumference of the stem 154, less than 120 degrees around a circumference of the stem 154, or otherwise. The fastener 148 can include a first set of threads 160 extending from one side of the stem 154 and a second set of threads 162 extending from the opposite side of the stem 154. Each of the first and second sets of threads 160, 162 can include one, two, three, four, or more thread portions 158. Each of the thread portions 158 within the first set of threads 160 or the second set of threads 162 can have the same shape or profile. Each of the thread portions 158 within the first set of threads 160 or the second set of threads 162 can be generally aligned with each other along a longitudinal axis such that the peripheral edges of each thread portion 158 are aligned with each other. The first set of threads 160 can be separated from the second set of threads 162 by a flat face 164 on one or both sides of the threads. As shown in FIG. 5C, the front and rears sides of the threaded end 152 include flat faces 164, while the left and right sides of the threaded end 152 include the thread portions 158. When viewed from the bottom or distal end of the fastener 148, the threaded end 152 can include a non-circular profile. For example, the profile of the threaded end 152 can include two arcuate portions (formed by the threads 160 and 162) separated by straight edges (formed by the flat faces 164).

A gasket 140 can be positioned around a bottom periphery 132 of the cover 104 to form a seal between the cover 104 and the base 102. In some configurations, the gasket 140 can be separately disposed between the cover 104 and the base 102. In other configurations, the gasket 140 can be integrally formed with the cover 104 to decrease the likelihood of leaks. For example, the gasket 140 can be poured around the bottom periphery of the cover 104 and irreversibly fused to the cover 104. The gasket 140 can include a foam material, an elastomeric material, or any other material suitable to form a seal.

The base 102 and/or the cover 104 can include a thermoplastic material, such as polycarbonate, and/or a metal material, such as copper, stainless steel, aluminum, bonderized metal, or otherwise. The base 102 and/or the cover 104 may be opaque or transparent.

The base 102 and/or the cover 104 can be manufactured as a contiguous member or a monolithic structure, without any fasteners. For example, the base 102 and/or the cover 104 can be formed by injection molding, additive manufacturing, or otherwise. In other configurations, the bottom wall 106 can be a monolithic structure and the raised portion 108 can be a separate monolithic structure configured to be attached to the bottom wall 106. The use of monolithic structures makes the interior space 110 of the enclosure assembly 100 less susceptible to hazards or weather conditions. Further, the use of monolithic structures reduces the total number of fasteners, which may rust and permit water intrusion.

As shown in FIGS. 3A-3D, the bottom wall 106, the raised portion 108, and/or the cover 104 can include one or more location markers to suggest a potential drill hole or punch hole. The one or more location markers can be dimples, location holes, mounting bosses, embossed knockouts, impressions, marker inscriptions, or otherwise. At least one location marker can be used to secure the base 102 to the roof (see location markers 112 on FIG. 3B). For example, the location markers 112 for securing the base 102 to the roof can be positioned in an upper half of the interior space 110. At least one location marker can be used to penetrate the roof and route a separate component (e.g., connector, conduit, or cable) into the interior space 110 of the enclosure assembly 100 (see location marker 114 in FIG. 3B). For example, the location marker 114 for penetrating the roof can be positioned in an upper half of the interior space and/or centered on the longitudinal centerline Y-Y of the base 102. At least one location marker can be used to mount a mounting member, such as a mounting boss for a DIN rail (see location markers 116 in FIG. 3B). For example, the location markers 116 can be positioned around a periphery of the interior space 110. At least one location marker can be a used to mount a ground bar (see location markers 118 in FIG. 3B). For example, the location markers 118 for mounting ground bars can be positioned at the upper and lower corners of the interior space 110. Further, as shown in FIG. 3A, the side walls 126 of the raised portion 108 can include one or more penetration lines 134 for routing connectors or other components outside of the raised portion. The locations of the one or more location markers are strategically placed around the box in order to enable installers to outfit accessories, such as standard DIN Rail in multiple positions. A cable connector or fitting can be inserted into a drilled hole to form a water tight seal with the separate component (e.g., connector, conduit, cable).

The bottom wall 106, the raised portion 108, and/or the cover 104 can also include one or more mounting members, such as a raised edge, that allows for the mounting of the accessory. The use of location markers and/or mounting members can help installers quickly secure the separate component (e.g., connector, conduit, cable). Each of the location markers and/or mounting members can be positioned within the interior space 110 to prevent any fasteners or components from being exposed to the environment.

In use, a sealant 150 can be applied to the lower surface of the bottom wall 106 (see FIG. 1). The sealant 150 prevents water from running through the sealed area between the enclosure assembly 100 and the roof. As shown in FIG. 1, the sealant 150 is applied in a horseshoe pattern, with the ends of the horseshoe facing downhill. Optionally, the sealant 150 can be applied in any other enclosed or open-ended pattern. The sealant 150 is applied in a region of the raised portion 108, for example, at least around each of the location markers and mounting members. Instead of sealing each individual mounting hole or member with sealant, the sealant 150 is applied as part of the flashing unit installation process. The sealant 150 can be any suitable sealant for water proofing, such as a structural adhesive. For example, the sealant used may be M-1® Structural Adhesive Sealant made by Chem Link of Schoolcraft, Mich, Geocel 2300, or Sikaflex 1a.

Figure 6:
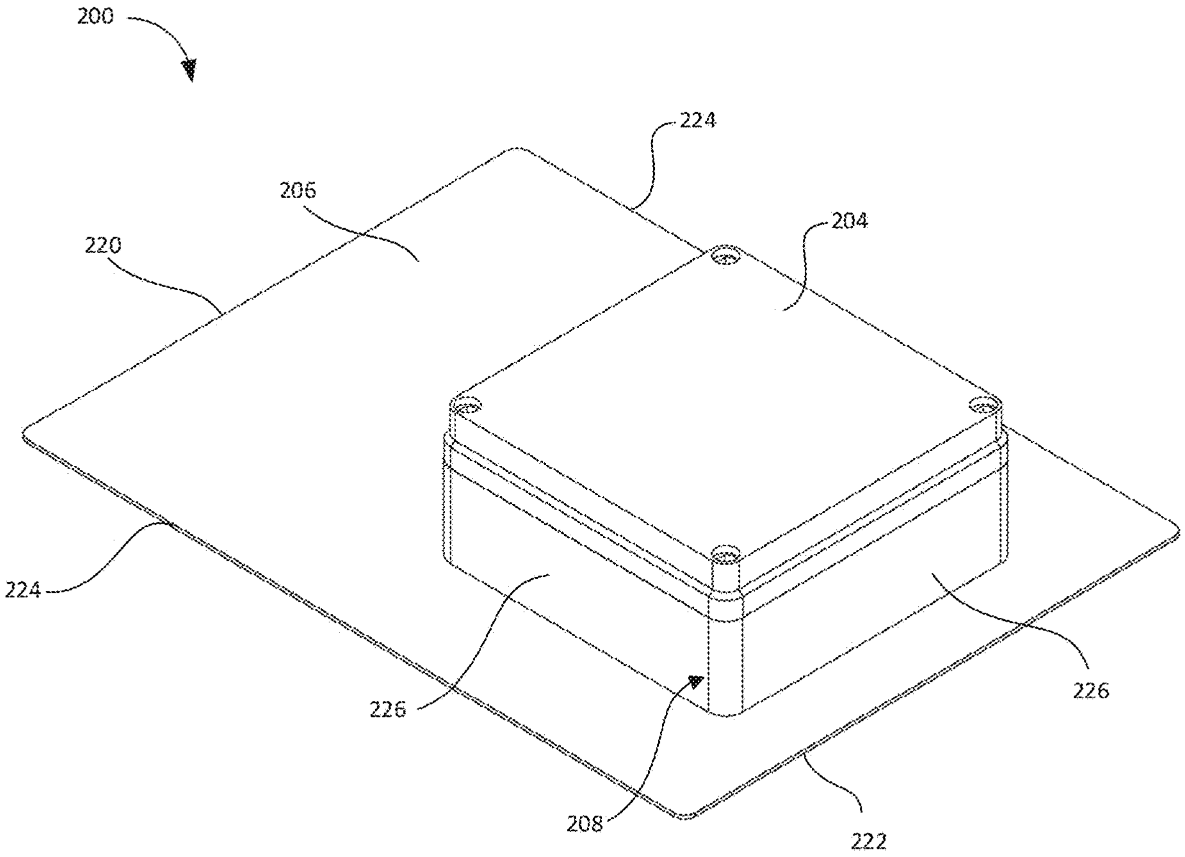
FIG. 6 illustrates another example of an enclosure assembly.

With reference to FIG. 6, another illustrative example of an enclosure assembly is shown. The enclosure assembly 200 resembles or is identical to the enclosure assembly 100 discussed above in many respects. Accordingly, numerals used to identify features of the enclosure assembly 100 are incremented by a factor of one hundred (100) to identify like features of the enclosure assembly 200. The enclosure assembly 200 is similar to the enclosure assembly 100 except as described below.

Unlike the enclosure assembly 100, the one or more side walls 226 of the raised portion 208 are not positioned at an oblique angle relative to a lower edge 222 of the bottom wall 206. Instead, as shown in FIG. 3B, each of the upper and lower side walls 226 of the raised portion 208 is parallel to the lower edge 222 of the bottom wall 206. Further, each side wall 226 is orthogonal to the lower edge 222 of the bottom wall. In this configuration, there is more space to work inside the raised portion 208 compared to the enclosure assembly 100.

While the enclosure assemblies 100 and 200 are described herein with respect to installation on roofs with roof shingles, this is not meant to be limiting. For example, optionally modified versions of the enclosure assemblies 100 and/or 200 can also be installed on roofs with roof tiles (e.g., terracotta tiles). As an illustrative example, roof tiles may be curved rather than flat like roof shingles, and therefore the bottom walls 106 and/or 206 may be curved or bent (e.g., into a wave shape) to match the shape of the roof tiles in embodiments in which the enclosure assemblies 100 and/or 200 are installed on roofs with roof tiles.

Terminology

Although certain embodiments and examples have been described herein, it will be understood by those skilled in the art that many aspects of the enclosure assemblies shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

As used herein, the relative terms "uphill," "downhill," "upper," and "lower" shall be defined from the perspective of the enclosure assembly when mounted on a rooftop. Thus, uphill or upper refers to the direction of the top of the roof and "downhill" or "lower" refers to the direction of the ground.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±5%, ±10%, ±15%, etc.). For example, "about 0.01 inches" includes "0.01 inches." Shapes disclosed herein, such as "square" or "rectangular," should be interpreted to include substantially similar shapes that fall within reasonable manufacturing tolerances, e.g., +/−0.15 inches.

What is claimed is:

1. An enclosure assembly for protecting a component on a rooftop, the enclosure assembly comprising:

a base to protect the rooftop from water intrusion, the base comprising:
a bottom wall; and
a raised portion extending from the bottom wall to provide a boundary around an interior space, the bottom wall having an enclosed portion within the interior space; and
a cover configured to be joined to the raised portion to cover the interior space;
wherein the enclosed portion of the bottom wall includes a first location marker to one or more of secure the base to the rooftop or route a component through a roof penetration into the interior space; and
wherein the bottom wall, outside of the interior space, does not include an aperture through the bottom wall or a location marker to secure the base to the rooftop.

2. The enclosure assembly of claim 1, wherein the first location marker is a hole having a first diameter for receiving a fastener therethrough.

3. The enclosure assembly of claim 1, wherein the location marker comprises a knockout having a second diameter sized to receive conduit therethrough.

4. The enclosure assembly of claim 1, further comprising a mounting member for mounting an accessory, the mounting member being secured within the interior space at the first location marker.

5. The enclosure assembly of claim 1, wherein the cover includes a gasket; and
wherein, in an installed configuration, in which the cover and the base are joined together to enclose the interior space, the gasket forms a seal with the base around a periphery of the interior space.

6. The enclosure assembly of claim 1, wherein the first location marker is positioned uphill of a transverse centerline of the interior space.

7. The enclosure assembly of claim 6, wherein the first location marker is positioned downhill of a transverse centerline of the base.

8. The enclosure assembly of claim 7, wherein the first location marker is one of a plurality of location markers to secure the base to the rooftop, each of the plurality of location markers being positioned within the interior space uphill of the transverse centerline of the interior space and downhill of the transverse centerline of the base.

9. A method of installing an enclosure assembly on a rooftop, the method comprising: providing a base to protect the rooftop from water intrusion, the base comprising:
a bottom wall comprising a top surface and a lower surface;
a raised portion extending from the top surface of the bottom wall to provide a boundary at least partially defining an interior space that includes an enclosed portion of the top surface of the bottom wall and a first location marker on the enclosed portion of the top surface of the bottom wall;
positioning the base on the rooftop so that an uncovered portion of the bottom wall that is outside the interior space is beneath a roof shingle on the rooftop;
mounting the base to the rooftop by securing a first fastener through the first location marker; and
securing a cover to the raised portion to seal the interior space against water intrusion.

10. The method of claim 9, wherein the interior space further comprises a second location marker; and
wherein mounting the base to the rooftop further includes securing a second fastener through the second location marker.

11. The method of claim 9, wherein mounting the base to the rooftop does not include securing any fastener through the bottom wall and the rooftop outside of the interior space.

12. The method of claim 9, wherein the raised portion further includes base holes at corners of a periphery of the raised portion;
wherein the cover includes cover holes configured to be aligned with the base holes when the cover is joined to the raised portion to seal the interior space; and
wherein securing the cover to the raised portion to seal the interior space includes inserting fasteners through a plurality of the cover holes and a corresponding plurality of the base holes.

13. The method of claim 12, wherein the base holes are included at each corner of the periphery of the raised portion; and
wherein the cover supports a gasket so that securing the cover to the raised portion includes forming a seal between the gasket and the base around the periphery of the raised portion.

14. A system for securing electrical components to a rooftop, the system comprising:
a base installed on a rooftop, the base including:
a bottom wall having a top surface and a bottom surface, the bottom surface of the base being in contact with the rooftop; and
a raised portion comprising a plurality of side walls extending from the top surface of the bottom wall, the plurality of side walls and an internal portion of the top surface defining the bottom and sides of an interior space of the base, the internal portion of the top surface including a plurality of apertures at which the base is secured to the rooftop and the bottom wall outside of the interior space not including any apertures at which the base is secured to the rooftop;
a planar uncovered portion of the bottom wall, positioned uphill of the raised portion below at least one shingle of the rooftop; and
a cover joined to the raised portion to seal the interior space against water intrusion.

15. The system of claim 14, wherein the internal portion further comprises an entry aperture that is sized to receive a conduit, and wherein a conduit at least partially extends through a corresponding aperture in the rooftop and through the entry aperture into the interior space.

16. The system of claim 14, wherein no apertures extend through the bottom wall outside of the interior space.

17. The system of claim 16 wherein each of the plurality of apertures is positioned one or more of:
uphill of a transverse centerline of the interior space; or
uphill of a transverse centerline of the bottom wall.

18. The system of claim 17, wherein at least one location marker on the internal portion of the top surface is positioned on an uphill-to-downhill centerline of the bottom wall.

19. The system of claim 14, wherein the cover includes a gasket that seals the base when the cover and the base are joined together to seal the interior space against water intrusion.

20. The system of claim 19, wherein the gasket is received in a channel and forms a seal with a tongue, and wherein one of:
the channel is formed in a main body of the cover and the tongue extends from the raised portion; or the channel is formed in the raised portion and the tongue extends from the main body of the cover.

* * * * *